March 2, 1965 S. S. THALER 3,172,045

VERNIER AMPLIFIER

Filed Oct. 8, 1962 7 Sheets-Sheet 1

Inventor:
Sheldon S. Thaler.
By Merriam, Smith & Marshall
Attys.

VERNIER AMPLIFIER

Filed Oct. 8, 1962

Inventor.
Sheldon S. Thaler.
By Merriam, Smith, + Marshall.
Attys.

March 2, 1965 S. S. THALER 3,172,045

VERNIER AMPLIFIER

Filed Oct. 8, 1962 7 Sheets-Sheet 3

Inventor.
Sheldon S Thaler.

By. Merriam, Smith, & Marshall
Attys.

March 2, 1965 S. S. THALER 3,172,045

VERNIER AMPLIFIER

Filed Oct. 8, 1962 7 Sheets-Sheet 4

Inventor:
Sheldon S. Thaler

By Merriam, Smith, & Marshall
Attys.

March 2, 1965 S. S. THALER 3,172,045

VERNIER AMPLIFIER

Filed Oct. 8, 1962 7 Sheets-Sheet 5

Inventor:
Sheldon S. Thaler.
By. Merriam, Smith + Marshall
Attys.

VERNIER AMPLIFIER
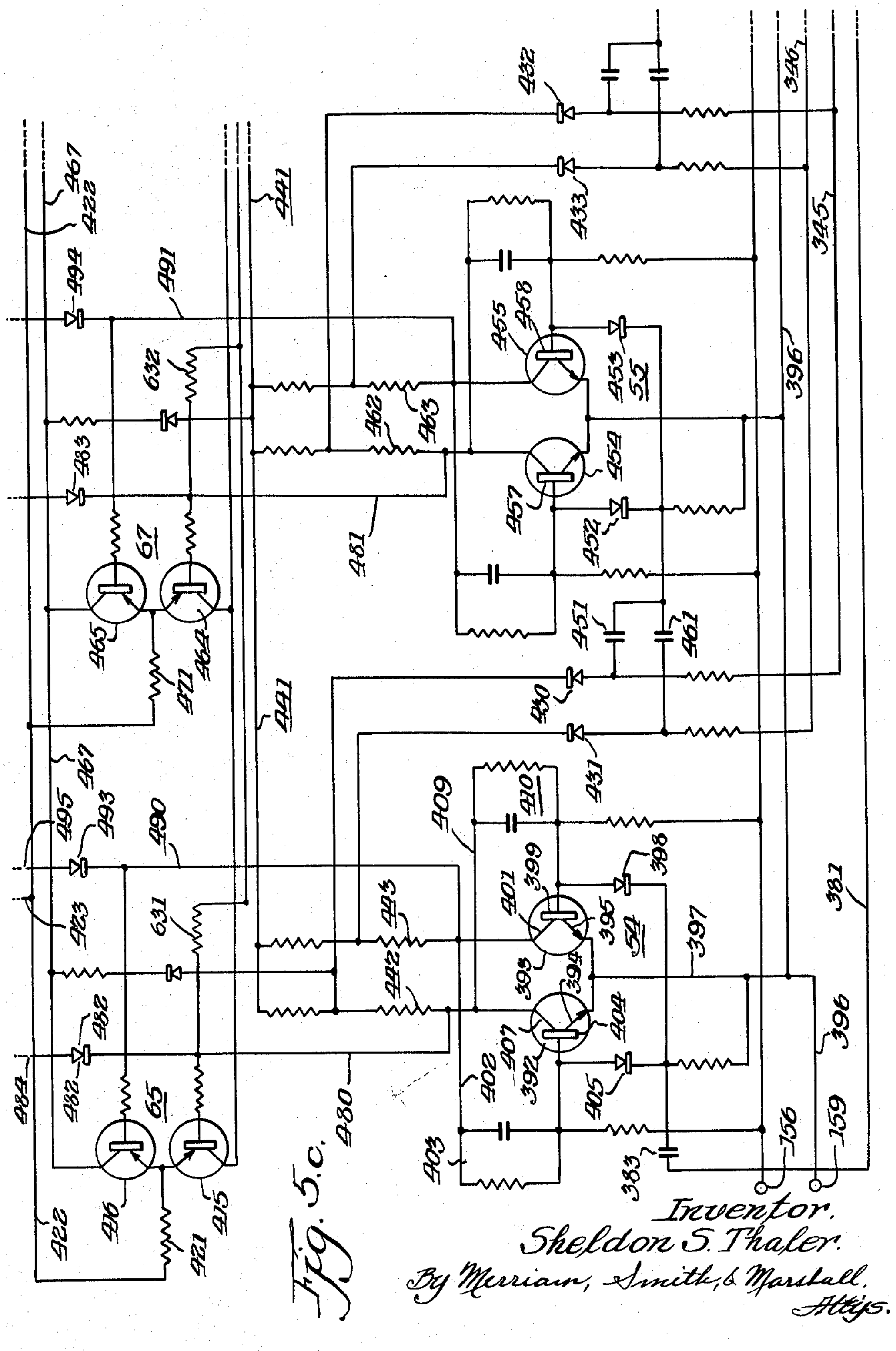
Fig. 5.c.
Inventor.
Sheldon S. Thaler.
By Merriam, Smith, & Marshall,
Attys.

VERNIER AMPLIFIER

Filed Oct. 8, 1962 7 Sheets-Sheet 7

Inventor.
Sheldon S. Thaler.
By Merriam, Smith, & Marshall,
Attys.

United States Patent Office 3,172,045
Patented Mar. 2, 1965

3,172,045
VERNIER AMPLIFIER

Sheldon S. Thaler, Stamford, Conn., assignor to Spaceonics, Inc., Geneva, Ill., a corporation of Illinois Filed Oct. 8, 1962, Ser. No. 228,976
15 Claims. (Cl. 328—71)

This invention relates to a solid state amplifier. The invention is primarily concerned with a form of amplifying device which is particularly useful in connection with telemetering circuitry and in the various channels of such form of apparatus.

Engineers concerned with the operation of telemetry systems have generally found development work difficult because most of the standard telemetry channels provide a relatively low accuracy in the range of 2% to 5%. Requirements necessary to meet high fidelity specifications at times demand that information be transferred through suitable amplifying units with an accuracy at least of the order of ¼ of 1%. Achievement of such a high degree of accuracy has generally been accomplished heretofore only through the use of highly complex and relatively cumbersome digital transmission circuits. Further than this, the fact that the output signals of most existing transducers are provided in analog form makes the analog-to-digital converter normally a further problem in the digital data transmission.

In accordance with the present invention, the foregoing problems are largely overcome by the use of circuitry wherein the input signals are divided into a selected number of equal parts or bits in such a way that the operation is essentially one where two telemetry channels are utilized to transmit the respective outputs and achieve a high degree of accuracy.

In the form in which the apparatus is herein to be described, a coarse signal is sent to reveal the increment in which the incoming signal is to be found. Then, a fine (or generally "vernier") signal is utilized to reveal the precise location of the signal within the prescribed increments. By use of the invention herein to be described it becomes possible to increase the channel accuracy by at least one order of magnitude.

The amplifier unit is one capable of operating over a wide imput signal level which, in addition, provides, where desired, dual outputs at selected ranges. Operational parameters are selected to provide a response time of less than 50 milliseconds. The device is generally insensitive to temperature and is highly efficient in its overall operation.

The invention is illustrated in its preferred form by the accompanying drawings in which:

FIG. 2 is in two parts and illustrates in graphical form the transfer functions and from this drawing

Figure 1:
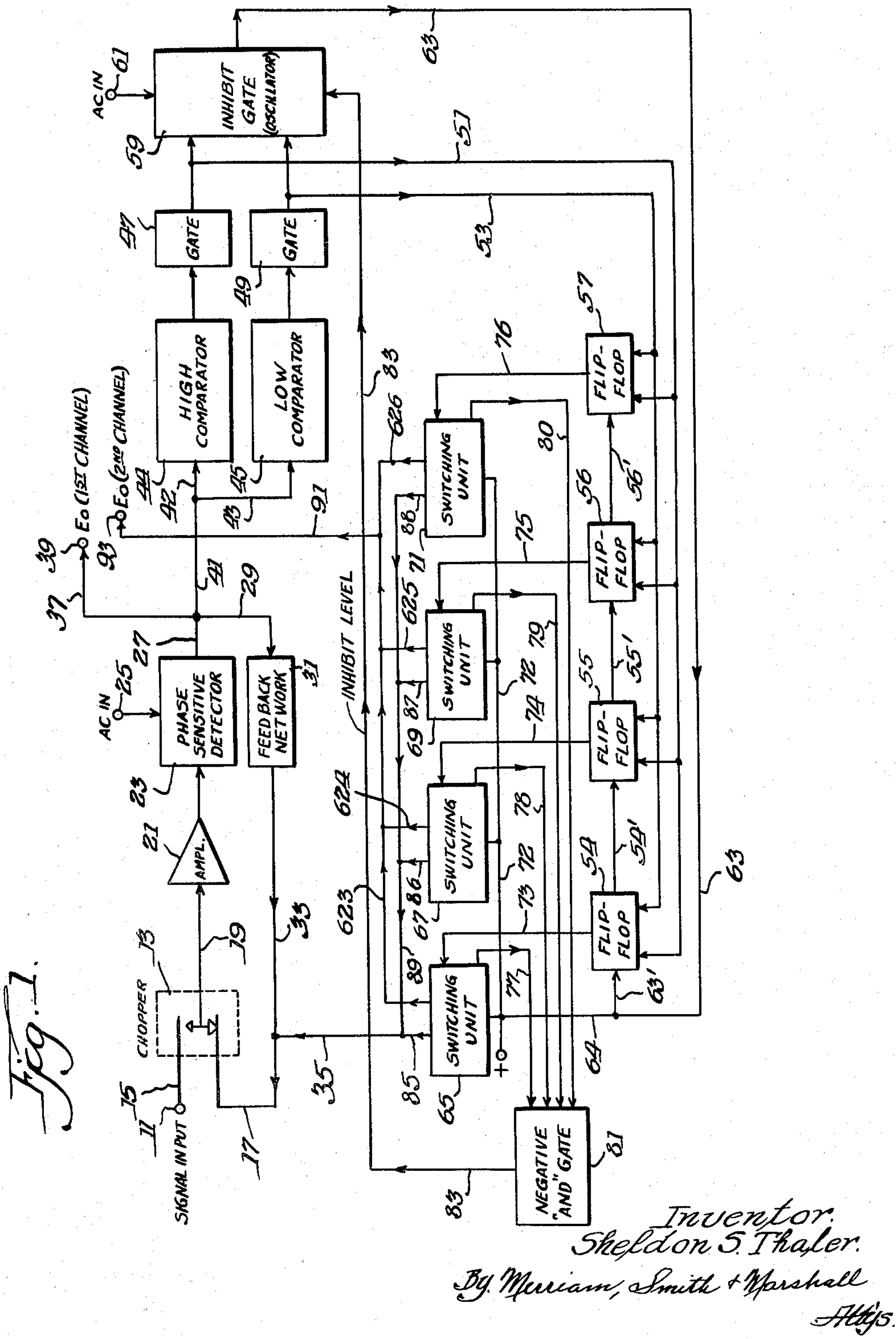
FIG. 1 is a diagram illustrating in block form the amplifier and its functioning.
Figure 6:
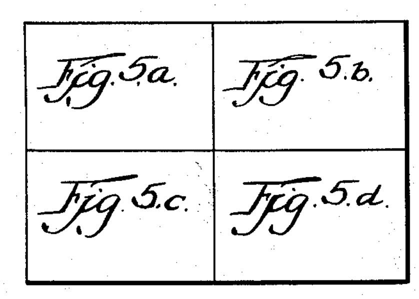

FIGS. 5*a*, 5*b*, 5*c* and 5*d* collectively represent the amplifier and switching combination which is diagrammatically shown by FIG. 1 but is here illustrated in a preferred form of circuit; and FIG. 6 is a block diagram illustrating the manner in which all of FIGS. 5*a*, 5*b*, 5*c* and 5*d* join to form a single unit.

Figure 2A:
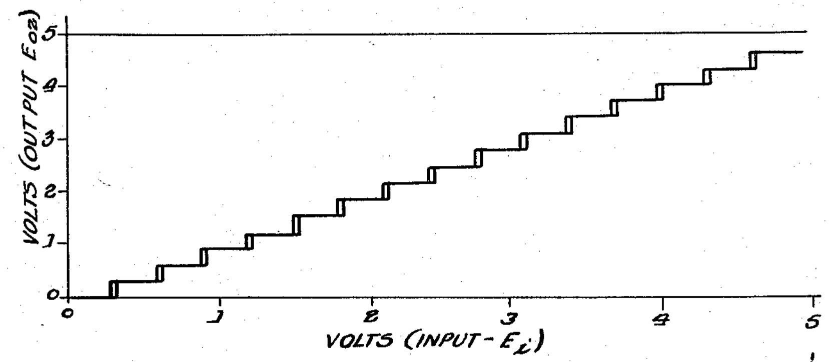
FIG. 2*a* represents the coarse output signal as the input signal progresses through a predetermined voltage change and FIG. 2*b* illustrates the second vernier output signal.
Figure 2B:
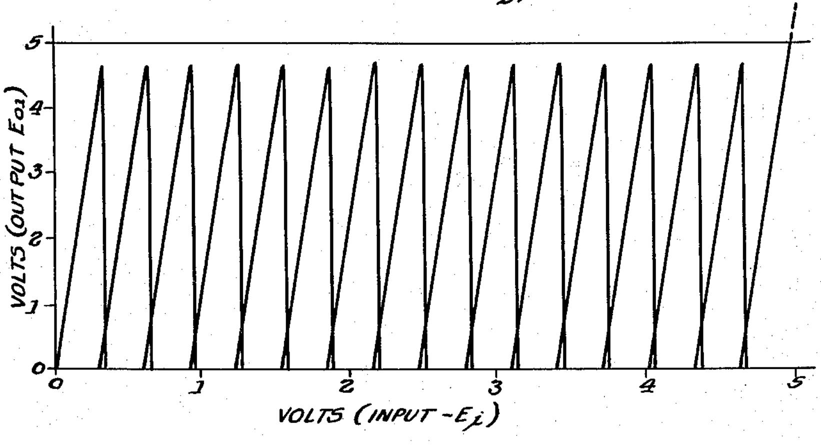

Referring now to the drawings, and for a moment first to the two parts *a* and *b* of FIG. 2, it will be observed that two output signals are displayed as a function of an assumed input signal voltage. Making reference to the drawings, the output signal which is represented by the ordinate value on the curve of FIG. 2*b* can be seen to go through (with the assumed showing) sixteen (16) excursions of approximately a voltage change between 0 volts and 5 volts as the input voltage traverses the assumed 0 to 5 volt range. The input voltage shown as $E_i$ is a single valued function of the output and, accordingly, it may be considered as being $$E_i = E_{o2} + \frac{E_{o1}}{K}$$

wherein $E_{o1}$ represents the analog output of the first channel and $E_{o2}$ represents the digital output of the second channel, as will be later explained. The factor K represents the D.C. amplifier gain.

In the operation of the circuitry here to be explained, the D.C. amplifier is one characterized as a highly accurate unit which utilizes the diagramed chopper (usually a solid state design to achieve high speed operation) as the comparator element between a selected analog input signal and a feed-back input which is dependent upon the input signal. In this circuit, the analog input signal is compared with the sum of the dual outputs of the amplifier after these outputs have been manipulated according to the equation above recited under control of the precision feed-back network. In this amflifying component, the gain is maintained at a high level of stability to achieve a high degree of system legibility and accuracy.

Broadly speaking, in the operation of the analog-to-digital converter, the output of the D.C. amplifier designated by the voltage $E_{o1}$ (shown by the curve of FIG. 2*b*) is utilized to produce the second output voltage $E_{o2}$ which is made to be proportional to the largest binary number below the input signal. Memory function is built into the circuitry by the use of a serial counter in the form of a plurality of interconnected flip-flop stages. As will be apparent from the showing of FIG. 4, a power supply is provided which insures complete D.C. isolation between input and output signals. A D.C. to A.C. inverter converts the input D.C. power to alternating current which is then rectified and regulated to the desired limits.

In the operation, a "start" circuit detects the output of the first amplifier and activates the serial counter whenever the output signal exceeds a preset limit. A degree of hysteresis is built into the high and low comparator circuits to insure that small input variations will not produce large output variations which might be occasioned by switching of the analog-to-digital converter. The effect of the so-called "hysteresis" loop is shown generally in FIGS. 2*a* and 3.

Figure 3:
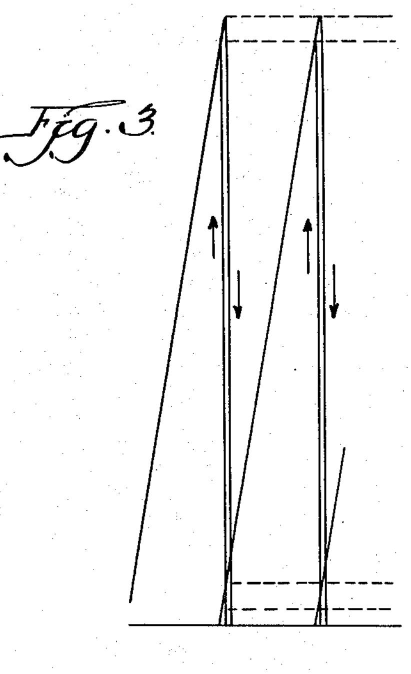
FIG. 3 represents an expansion in the analog output signal as shown by FIG. 2*b* occurring at a significantly lower input voltage than the increase represented by FIG. 2*a* so that FIG. 3 constitutes an expansion of one output signal thereby to portray in greater detail the switching phenomena.

Referring to FIG. 3, it will be observed that a reduction in the value of the digital output signal $E_{o2}$ has been shown as occurring at a significantly lower input voltage than the corresponding increase in the voltage value $E_{o2}$. FIG. 3 is an expansion of slightly more than one complete output cycle, thereby to portray the switching phenomena in greater detail.

Before entering into a detailed description of the schematic operation of FIG. 1, it may be noted that the input signal is applied directly to the D.C. amplifier. Under these conditions, three distinct possibilities exist for the output signal derived from this amplification which signal is designated as by FIG. 2*b* as the voltage value $E_{o1}$. If, for instance, the value of the voltage $E_{o1}$ is greater than the high comparator limit, the serial counter comprising the flip-flop circuits and the switching units becomes activated and counts in an upward direction. This causes a higher output voltage from the transistor switching network. This output voltage, as will later be explained, is subtracted from the input signal, and the value of the output is accordingly reduced. The serial counter then continues to count up to a maximum (as designated by FIG. 2*a*) limit of sixteen and until a time when the output, in the assumed case of operation, is between zero and five volts. If a condition occurs where the output voltage is between the limits of the high and low comparator circuits, the serial counter is at the proper binary output and the system is stable. If, however, the output signal is below that of the low comparator limit (approximately 0), the counter is activated to count down until equilibrium is restored. The counter, as will be later explained, is thus reversible, and provides an extremely high response rate.

With the foregoing in mind, reference may now be made to the block diagram showing of FIG. 1 in which an analog signal input is assumed to be applied at the input terminal 11 to be fed to the chopper 13 by way of the conductor 15. The chopper 13 also receives a signal by way of the conductor 17 from each of a feedback network and a counting and switching circuit, later to be described. The instantaneous circuit condition of the chopper 13 determines whether or not the signal input at terminal 11 is fed through the conductor 19 to the amplifier 21, or whether the signal voltage available on the conductor 17 is passed over the conductor 19 to the amplifier 21. In either event, the signal output of the amplifier 21 is supplied to a phase-sensitive detector 23 which is activated in accordance with a suitable alternating current control input voltage, as available at the terminal 25 (or conductor 262 as will be explained when referring to FIG. 5*b*).

Output signals are derived on the conductor 27 and a part of these signals is fed back by connection through the conductor 29 to the feedback channel conventionally represented by network 31. The output of the feed-back network 31 is supplied by conductor 33 to the conductor 17 leading into the chopper 13. Similarly, the outputs from the various switching units which are controlled by the separate serially arranged counters, later to be described, are connected to be supplied also through conductor 17 to the chopper, thereby insuring that either the supplied signal or the corrected and fed back signal reaches the amplifier 21 through the chopper circuitry.

Figure 5A:
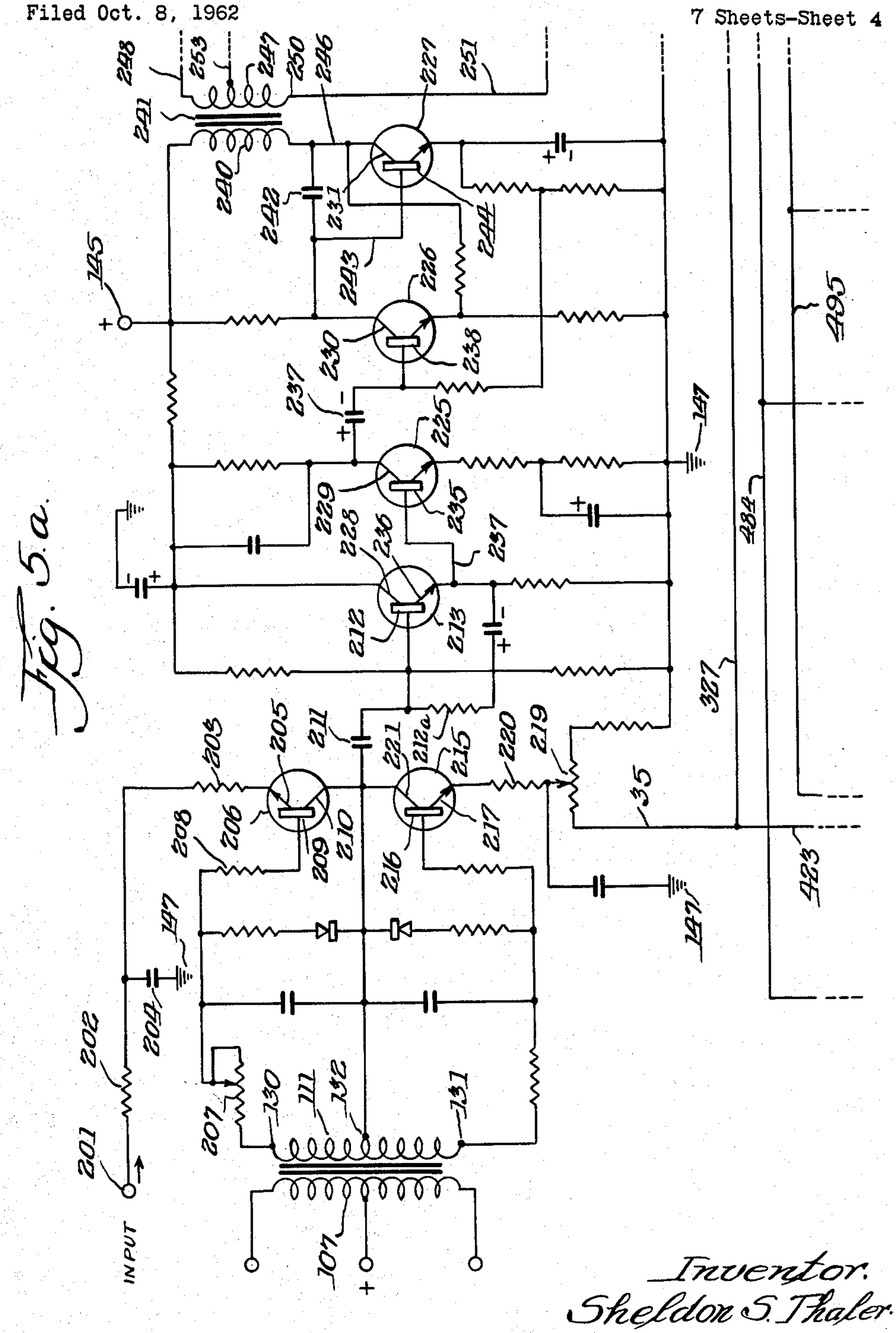
Figure 5B:
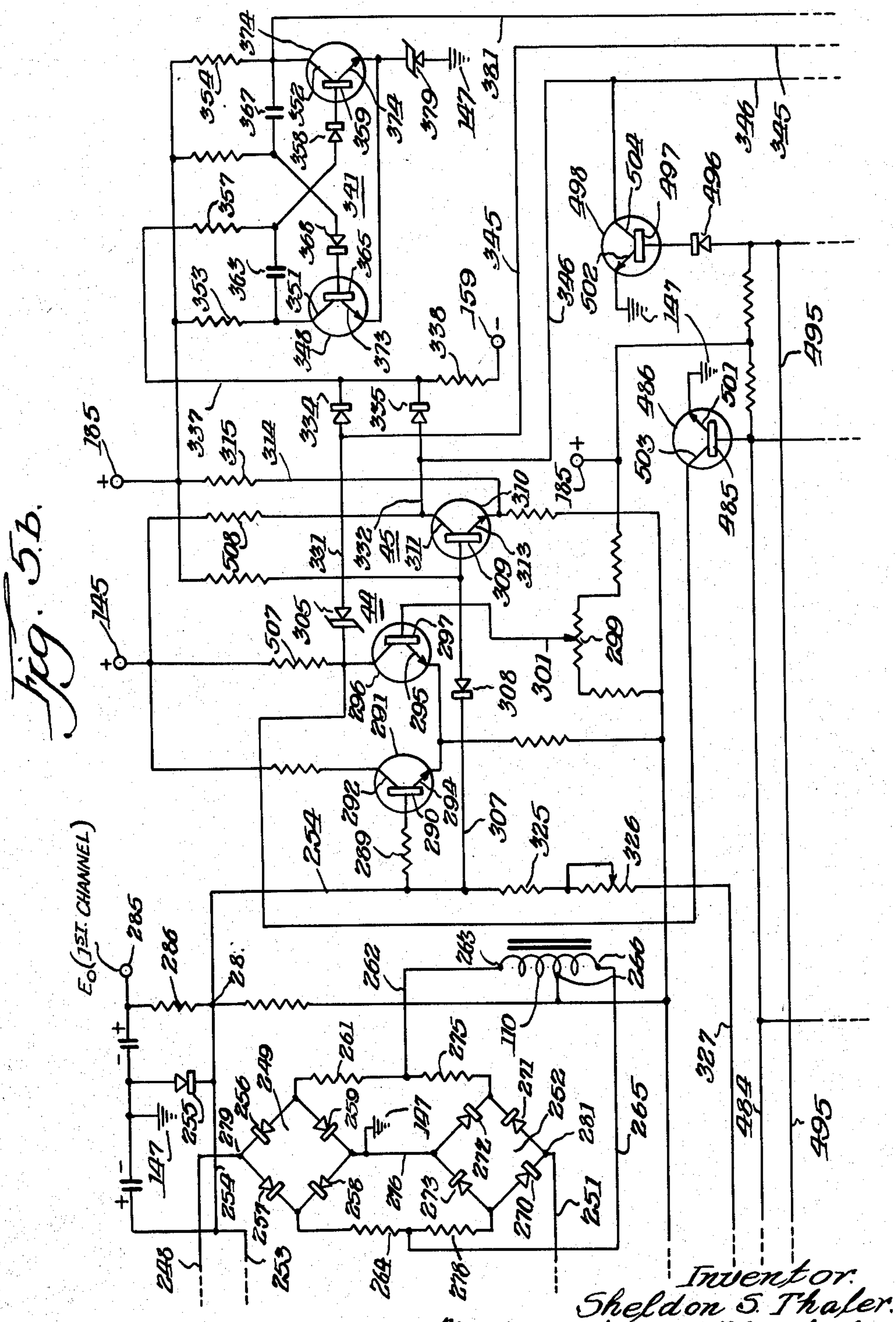

The second part of the output from the phase-sensitive detector 23 is supplied through conductor 37 to the terminal 39 whereat the output, as designated by the curves of FIG. 2*b*, is available. The output of the phase-sensitive detector 23 is also supplied by conductor 41 through conductors 42 and 43 to the "high" comparator 44 and the "low" comparator 45, respectively. Outputs from the two comparator circuits (see particularly circuitry as depicted by FIG. 5*b*) is supplied to the gates 47 and 49 and thence through conductors 51 or 53, as the case may be, to the counting circuitry, to be described, and which comprises the multiplicity of serially connected flip-flops 54 through 57 with associated control circuitry.

When the high comparator 44 provides an output that is gated through the gate 47, a signal is supplied through conductor 51 to the various flip-flops 54 through 57 of which the outputs sequentially connect through conductors 54', 55' and 56'. When output signals are derived from gate 49 and the low comparator 45 signals are supplied to the flip-flops through the conductor 53.

It will be further explained in connection with FIGS. 5*a* through 5*d* that the voltages on conductors 51 and 53 constitute "steering" controls and determine whether the counters count "up" or "down" to reach the stabilized value. Also, outputs from the gates 47 and 49 are fed through the inhibiting gate 59 (which is preferably in the form of a square-wave oscillator) which is controlled in its operation by the A.C. voltage input at 61. Output from the inhibiting gate is then supplied through conductors 63 and 63' to control the initial flip-flop of the series.

The conductor 63 also connects via conductor 64 to control the first of a series of switching units 65, as well as similar units 69, 70 and 71, to the latter of which the inhibitor signal is supplied through conductor 72. The output of the flip-flop circuits 54 through 57 is supplied also to the switching units 65, 67, 69 and 71 through conductors 73 through 76, respectively, and the outputs from the switching units, as above mentioned, are supplied through conductors 77 through 80 to the so-called negative "and" gate 81 whose output feeds through the conductor 83 to the inhibitor gate 59 previously mentioned.

It was heretofore stated that the chopper 13 received a control voltage through conductors 35 and 17 (as supplied from the feed-back network 31). It also was stated that the second input was a controlled voltage from switching units 65, 67, 69 and 71. These latter voltages are supplied through conductors 85 through 89 and are combined in conductor 35 to feed through conductor 17 with the feed-back voltages. The signal voltages so supplied are all obtained as output control voltages from the switching units to the chopper. It should be noted that a second voltage output shown available at the output of these switching units is also supplied by conductors 623, 624, 625 and 626 to connect with output conductor 91 to a terminal point 93 whereas the voltage $E_{o2}$ available in the second channel is supplied.

With the foregoing in mind, it may be pointed out that the flip-flops 54 through 57 operate essentially as multivibrator circuits (see particularly FIGS. 5*c* and 5*d*) and each comprise essentially two cross-connected transistor components. The components function in one preferred manner essentially as binary counters, so that one or the other of transistors forming each pair to insure the flip-flop action, is conducting. The outputs of the flip-flops are fed sequentially from one element to the other for triggering purposes as counting progresses.

From what has been stated, it will be apparent, in considering one particularly suitable type of circuit functioning to provide the operation of the block diagram, that for a condition where the voltage of a signal output $E_{o1}$ is greater than at which the high comparator functions at the limit to which it is set, the serial counter is activated and counts up, thus causing a higher voltage output from the switching network comprising the switching units 65, 67, 69 and 71. The developed feed-back voltage, as will be apparent from what is stated, is subtracted from the input signal so that the voltage $E_{o1}$ during the time this occurs and during the time the serial counter continues to count up to a maximum of 16, with the assumed system, until the voltage $E_{o1}$ is less than 5 volts. At times when the voltage $E_{o1}$ is in the range between the limits of the high and low comparators 44 and 45, the serial counter circuitry is at the proper binary output and the system is stable. If the voltage $E_{o1}$ is below the limit at which the low comparator 45 operates, the counter is activated to count down until equilibrium is restored. The count direction is determined by the steering control represented in FIG. 1 by voltages on conductors 51 and 53. This utilization of a reversible counter circuit provides extremely high response rates. The operation will be set forth in further detail in connection with the circuitry of FIGS. 5*c* and 5*d*.

Figure 4:
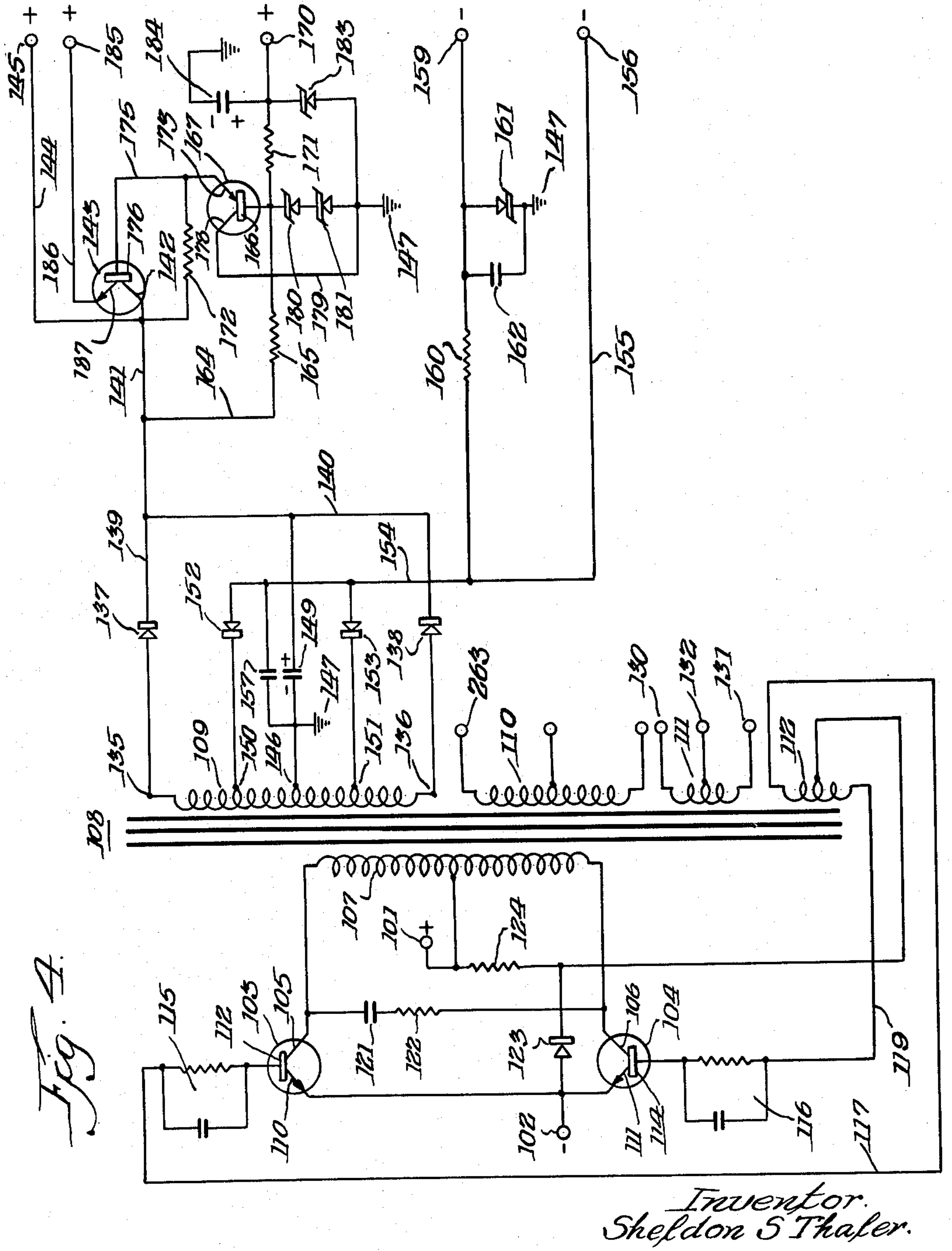
FIG. 4 is a circuit diagram of one form of power supply for use in connection with the amplifier depicted in block form by FIG. 1 and shown also by other figures.

Considering now, for detailed reference, forms of circuitry which have been found particularly suitable, reference may be made first to FIG. 4 showing one form of power supply. In this operation a suitable source of direct current is connected between terminal points 101 and 102 in such fashion that the source is poled positively at terminal 101 relative to terminal 102. In this fashion the transistors 103 and 104, respectively, have their collector electrodes 105 and 106 connected at opposite ends of the primary winding 107 of the transformer conventionally represented at 108. This transformer is provided with a multiplicity of secondary windings 109, 110, 111 and 112.

The power supply system operates in such a sense that the voltage which is negative relative to ground and available at terminal 102 is applied to the emitters 110 and 111 of transistors 103 and 104. The base elements 112 and 114, respectively, connect through the time constant circuits 115 and 116, comprising the series resistance elements and shunt capacities, to the outer terminals, of the transformer secondary 112 by way of conductors 117 and 119, respectively, to provide opposite potentials effective at the base of each transistor element.

The collectors 105 and 106 connect through the time constant circuit comprising capacity 121 and series resistance 112. The diode 123 connects between the negative supply terminal 102 and the positive supply terminal 101 by way of the resistor element 124 and serves as a steering diode or starting mechanism. With this control arrangement the resistor insures an initial current flow in the transistor circuit. With buildup of current and the control effective on base elements 112 and 114 in alternate sense due to connection to the transformer secondary, the circuit functions as an oscillator and sets up a wave formation very roughly approximating a squared wave which is fed under these conditions as essentially an A.C. wave through the transformer primary 107 to all of the transformer secondary windings 109, 110 and 111.

For illustrative purposes, the outer terminals 130 and 131 of winding 111 may be considered to supply the control voltages to the amplifier circuitry shown particularly by FIG. *5a* by way of the connection as there indicated. The center terminal 132 is also indicated. Reference later will be made to the showing of FIG. *5a* but suffice it at this time to state that the winding 107 of FIG. *5a* is indicated as a winding having voltage crests as in the showing of FIG. 4.

The voltages induced into the various secondary windings of the transformer 108 are applied for the purpose of obtaining either substantially precisely stabilized A.C. at a selected voltage level or substantially stabilized but not necessariy precisely unvarying levels of voltages. Considering the circuitry shown at the top of FIG. 4 and assuming, illustratively, that the source (not shown) connected at terminals 101 and 102 is poled respectively negative and positive with respect to a level (such as ground) by an amount considered illustratively as +28 volts and zero the stabilized and substantially stabilized voltages will be as illustrated in the drawing.

The upper terminal 135 and the lower terminal 136 of secondary winding 109 connect through the diodes 137 and 138 and conductors 139 and 140 to supply voltage at a selected level by way of input conductor 141 to the collector 142 of transistor 143. This same voltage is available by way of conductor 144 at output terminal 145 and here may be illustrated as substantially +30 volts. The center tap 146 of winding 109 is grounded at 147 and any alternating current component of the rectified output from the rectifiers 137 and 138 is by-passed to ground by way of conductor 140 and capacitor 149.

Similarly, a generally intermediate voltage, as available at tapping points 150 and 151 of the secondary winding 109, is supplied by way of the diodes 152 and 153 through conductors 154 and 155 to a terminal point 156. This voltage, as becomes evident from the connection illustrated, is generally stable but not regulated. As was the case with the higher voltage, the alternating current component of the rectified voltage from the diodes 152 and 153 is by-passed to ground 147 by way of capacitor 157. Illustratively, the voltage available at the output terminals 156 and 159 are respectively −32 volts and −12 volts with the assumed control voltages.

A voltage of a reduced magnitude is available at the output terminal 159 through resistor 160 with the stabilized voltage value being obtainable by reason of the indicated Zener diode 161 connected between terminal 159 and ground 147. The Zener diode is by-passed in normal fashion by capacitor 162. The Zener diode is preferably one arranged to provide a stabilized voltage of about −6 volts at the terminal point 159.

The higher voltage, as supplied through conductor 141 and effective upon the collector 142 of the transistor 143, is also applied by way of the conductor 164 and resistor 165 to the base electrode 166 of transistor 167. This same voltage is supplied to the output terminal 170 through resistor 171.

The high voltage on the conductor 141 is supplied through the resistor 172 to the emitter 173 of the transistor 167, which emitter is connected by conductor 175 to the base 176 of transistor 173. The collector 178 of transistor 167 is grounded at 147 through conductor 179. Between the base 166 of transistor 167 two serially connected Zener diodes 180 and 181 are provided to stabilize the voltage effective upon the base 166 of transistor 167. The Zener diodes are preferably of the type 1N936 and accurately stabilized to approximately 9 volts each, so that, in the illustrated example, the voltage effective on the base 166 of transistor 167 is approximately +18 volts.

Similarly, the voltage available at the output terminal 170 is regulated by a Zener diode 183 connected between conductor 173 and ground 147. This diode is preferably of the type 1N939 and, in the assumed example, provides a highly stabilized voltage at the terminal point 170 of approximately +9 volts. A suitable by-pass condenser 184 provides an A.C. connection of this terminal point to ground.

The voltage available at the terminal point 185, which connects by conductor 186 to the emitter 187 of transistor 143, is set at a stabilized value of approximately +18 volts for the example given. Stabilization is maintained by reason of changes in potential on the emitter 173 of transistor 167 causing a control on the transistor 143 in such a fashion that the voltage drop available changes in accordance with the changes in potential on the conductor 141, but, by reason of the regulation provided by transistor 147, maintains the voltage at the terminal 185 extremely constant. In this fashion the transistors 143 and 157 compensate for each other and, with the circuitry shown, provide a regulated output at terminal 185 as compared to an unregulated output at the terminal 145.

With these voltages available as control voltages and for supplying operational control voltages at different points in the system, reference may be made to the various parts of FIG. 5, in which the indicated voltage supply points correspond to the terminal points indicated on the power supply.

If reference is now made to FIGS. *5a* through *5d*, arranged with respect to each other as designated by the diagrammatic showing of FIG. 6, input signal voltages are supplied to the input terminal point 201 (like point 11 of FIG. 1). These signal voltages are analog signals of any desired character adopted for amplification in the D.C. amplifier component. The input signal is supplied by way of the indicated resistances 202 and 203 and the integrating condenser 204 connected to ground 147 so as to constitute an input signal upon the emitter 205 of transistor 206. Switching voltage of selected magnitude, as controlled by the rheostat 207, is supplied through the resistor 208 to the base 209 of transistor 206 to control its operation. The output voltage from this transistor, as available at its collector 210, is supplied through the coupling condenser 211 to the base 212 of an emitter-follower transistor 213.

Transistor 215 is connected to be supplied at its base electrode 216 with a voltage from the transformer winding 111 which approximates that supplied to the base 209 of transistor 206 but is out-of-phase therewith. However, in this instance the emitter 217 of transistor 215 is supplied with a compensating signal, as available from the switching units described in the diagrammatic showing of FIG. 1. This voltage is available through the potentiometer 219 which serves as a compensating voltage for Zener diode tolerance (183) and which is fed through transistor 220. Output from the collector 221, which electrode is connected to the collector 210 of transistor 206, is supplied to the emitter-follower transistor 213 from the transistor 215.

The combination of transistors 206 and 215, when connected to be alternately active (due to opposite voltage polarity at each of terminals 130 and 131, as shown) serves as a chopper (as illustrated by element 15 of FIG. 1). The transistors 206 and 215 are alternately energized and the feed-back voltage from the system as supplied to the emitter 217 of transistor 215 serves as a voltage which is effectively compared with that of the input available at the input terminal 201. The substantially alternate operation of transistors 206 and 215 provides an output which is supplied by way of the coupling condenser 211 and across the associated input resistor 212*a* to the base 212 of the transistor 213.

A positive operating voltage to transistor 213 and to transistor elements 225, 226 and 227 through which signals supplied are successively passed, as will be explained, is supplied at the terminal point 145, and in each instance supplied to the collector elements 228, 229, 230 and 231. The transistor 213 is emitter-follower coupled to the base 235 of transistor 225 by way of the connection of emitter 236 thereto through conductor 237. Bias to ground 147 of the various transistor electrodes is established through the indicated transistor elements, some of which are by-passed and need not be further explained. The output amplified voltage from the transistor 225 is supplied to a further amplifying transistor 226 through the coupling condenser 237 connected to the base 238 thereof.

Output signal voltages from the transistor 226 are supplied to the primary winding 240 of transformer 241 through coupling condenser 242. Likewise, the same signal is applied through conductor 243 to the base 244 of the transistor 227 and this voltage, as amplified, is also supplied through conductor 246 to the primary winding of the transformer 241. The emitters of transistors 226 and 227 are biased in the indicated fashion relative to the remaining electrodes and to ground.

The output signals as available on the secondary winding 247 of transformer 241 are connected by the upper conductor 248 to one junction of the phase detector element combination 249 and the lower end connection 250 by way of the conductor 251 to a junction point of a second phase detector 252. An intermediate point 253 on the secondary winding 247 connects through conductor 254 in a fashion indicated to the comparator circuits (later to be described) through transistor 291. The output also feeds back to the compensator transistor through conductor 327 as will later be set forth in more detail. Lastly, conductor 254 connects to the negative terminal of the diode 255 and thence to ground 147 for by-passing desired negative signals to ground, and by way of resistor 286 to terminal 285, at which point a remainder output is available.

The detector combination 249 comprises a group of four ring-connected diodes 256, 257, 258 and 259, with the junction of the anode and cathode elements of diodes 258 and 259 being grounded at 147, the anode elements of diodes 256 and 259 being connected and thence connected through resistor 261 and conductor 262 to the outer terminal 263 of transformer secondary 110.

Since the control of which of the transistors 206 and 215 is conducting to pass either the input analog signal available at conductor 201 or the correcting signal available at conductor 205 is established by the instantaneous polarity of the voltage available at points 130 or 131 of transformer winding 107, it can be appreciated that because the winding 110 is also a part of the power supply (and energized similarly to winding 107) the voltage at point 263 will either instantaneously be in-phase or out-of-phase with that voltage available instantaneously at point 131 or 130 of winding 111. For these conditions it is apparent that terminal 263, for instance, reaches its most positive voltage point at a time when the potential on the conductor 248 is at one extreme or the other. Illustratively, if conductor 248 is at its most negative potential when terminal 263 is positive, then the voltage available on the conductor 251 is at its most positive value. Similarly, for the stated conditions, the voltage on conductor 253 is at some intermediate value. Conversely, if conductor 248 is at its most positive voltage point when the voltage at terminal 263 is positive, then, of course, at that particular instant, conductor 251 is at its most negative point and conductor 253 which feeds its output voltage to conductor 254 and thence to the comparators is some intermediate value.

For the stated conditions, if it be assumed, for instance, that conductor 262 is instantaneously positive (terminal 263 being positive) the effect is to ground terminal 279 due to current flow through diodes 256 and 259. At this time the voltage available on conductor 253 will have some value above a ground potential which is fed as an output signal into the comparators illustratively designated in FIG. 1 as 44 for the "high" condition and 45 for the "low" condition. At the next half cycle of the power supply voltage, the polarity of terminals 266 and 263 reverses so that in this instance point 281 is effectively connected to ground 147 by reason of placing all of diodes 272, 271 and 270 in a conducting state.

At this time the signal supplied by conductors 253 and 254 to the comparator circuits is measured by the ratio of the voltage on conductor 253 as it connects to the winding 247 as compared to the potential at points 248 and 250. So considered, it is apparent that the voltage available on the conductor 253 alternately represents the correcting voltage and that voltage which is due to the supplied analog signal at input terminal 201. At the same time, a voltage which may be termed the remainder output becomes available at terminal 285 through the output resistor 286 which connects at point 287 to the output conductor 254. This remainder output will depend upon the phase of the signal available.

Considering the voltage supplied by conductor 254, this output is supplied by way of resistor 289 to the base 290 of an emitter-follower transistor 291. The collector 292 of this transistor is supplied with positive voltage from the terminal 145. The emitter 294 is connected to the emitter 295 of transistor 296 which constitutes the high comparator, generally designated at 44. The base electrode 297 of transistor 296 is appropriately biased by a control established by way of connection to the stabilized voltage terminal 185 as varied by the controllable potentiometer 299 whose adjustable terminal connects by conductor 301 to the transistor base. Collector voltage is also supplied from terminal 145 and this voltage is accurately regulated by the Zener diode 305.

When the voltage on the conductor 254 is in the opposite polarity to cut off transistor 291, the supplied voltage from conductor 254 is fed through conductor 307 and diode 308 to the base 309 of transistor 310 which constitutes a part of the low comparator, broadly designated as 45. Positive voltage on collector 311 is maintained from terminal point 145. The emitter 313 is held at a highly stabilized point by virtue of its connection through conductor 314 and resistor 315 to the stabilized voltage point 185.

Signals available on conductor 254 to supply either transistor 291 or transistor 310 also flow through resistor 325 and potentiometer 326, which controls the gain in the feed-back system, and thence by way of conductor 327 to conductor 35 and through the Zener compensating potentiometer 219 and thence through the indicated capacitor back to ground 147. Thus, the potential instantly effective at the emitter 217 of the transistor 215 is carefully stabilized. Outputs from the transistors 296 and 310, as available at the respective collector electrodes, are supplied by way of conductors 331 and 332 to diodes 334 and 335 whose cathode elements connect to conductor 337 which, in turn, connects to the negative terminal point 159 through resistor 338.

The diodes together constitute an "or" circuit and serve to trigger the flip-flop (or inhibitor oscillator) generally designated 341. Also, the outputs from the high comparator 296 are supplied by way of the conductor 345, while the output from the low comparator transistor 310 is supplied by conductor 346, to the flip-flop counting circuits conventionally designated 54, 55, 56 and 57.

The flip-flop or inhibitor oscillator 341 comprises a pair of cross-connected transistors 348 and 349 which derive operating potentials at the collectors 351 and 352 from the terminal 185 by way of resistors 353 and 354, respectively. The output signals from the "or" circuit, including diodes 334 and 335, are supplied by conductor 337 to trigger the flip-flop 341 by way of the connection through the resistor 357 and diode 358 to the base 359 of the transistor 349. The cross-connections are provided from the collector 351 of the transistor 348 to the base 359 of transistor 374 by way of the coupling capacitor 363 and the diode 358. The reverse cross-connection from the collector 352 of transistor 374 is made to the base 365 of transistor 348 through the coupling condenser 367 and the diode 368. The emitter electrodes 373 and 374 are each held at a stable voltage relative to ground 147 by the Zener diode 379.

Output voltages from the flip-flop 341 are supplied across load resistor 354 by way of conductor 381 which constitutes a voltage serving as an inhibiting voltage to become effective on the counter flip-flops 54 through 57, although it will be understood that the control on the group of flip-flops is initiated by virtue of the control exercised on the initial flip-flop 54 which derives the inhibiting signal from conductor 381 via coupling capacitor 383.

It was stated above that the circuitry described function in such fashion that if the signal value $E_{01}$ happens to be greater than the limit of the high comparator 44, the serial counters or flip-flops 54 through 57 are activated and count in an upward direction.

The counter of the first stage 54 comprises a pair of cross-connected transistor elements 392 and 393. For reference purposes, it may be assumed that one or the other of these transistors is at all times conducting. As the circuit will be described, a switching change between one or the other of the transistors 392 and 393 will be effected on a negative pulse (although the reverse condition could take place).

Assuming now, for example, that the emitters 394 and 395 of these transistors are connected together and supplited with a negative voltage from terminal 159 through the conductors 396 and 397. First consider that, illustratively, transistor 392 is conducting and that a negative control pulse is applied through the conductor 381 and diode 398 to the base 399. This pulse causes the transistor 393 to take over the control and to conduct.

Then, by virtue of the feed-back provided from the collector 401 through the feed-back connection 402 and R-C network 403 to the base 404 of the transistor 392, current flow through transistor component 392 is interrupted. For the condition thus assumed, the next pulse supplied by the conductor 381 and the coupling condenser 383 is passed through the diode 405 to control and activate or energize the transistor 392 to cause it to pass current so that current flow available at the collector 407 causes a reverse condition of operation of the transistor 393 by way of the feed-back provided by conductor 409 and the R-C network 410 connected to the base 399. For these conditions the transistors 392 and 393 constituting the flip-flop operate to produce a current flow which is passed along to the first switching unit 65.

At times when transistor 392 conducts, the transistor 415 of switching unit 55 will be caused to pass current. Conversely, for conditions when transistor 393 is conducting, a control will be effected upon the operation of the transistor 415 of the switching unit. Current flow due to the operation of the switching unit 65 passes through the load resistor 421 and conductor 422 which connects to conductor 423 and thence through conductor 35 and the Zener compensator 319 to become a part of the circuitry establishing the bias on the emitter of transistor 215 which constitutes a part of the "chopper" 13.

In this fashion, if it can be assumed that the counter is a binary and that the instantaneous condition is represented by the binary number 0011, it will be appreciated that in the counting an upward count of one would be represented by a situation where the binary number changed to 0100, but a downward count would be represented by the binary number 0010. A change always occurs in at least the last number to provide the control. In order to determine whether or not additional flip-flop circuits 54 through 57 are controlled, as a result of pulses developed by the oscillator circuit 341, and applied by conductor 381 to count "up" or "down," so-called steering diodes 430 and 431, connected respectively to conductors 345 and 346, are provided to control the second flip-flop 55. Similarly, steering diodes 432 and 433 are provided to control the operation of the third flip-flop 56 and, lastly, steering diodes 434 and 435 are provided to control the last or most right-hand flip-flop (see FIG. 5*d*).

Consider now a condition where the transistor collectors are energized from the voltage source connected at terminal 185 with the voltage being supplied by way of conductor 441 and through the load resistors 442 and 443 to transistors 392 and 393, respectively. Transistors of the flip-flops 55, 56 and 57 are also supplied with voltage from this same source but needed not be considered at the moment.

With one or the other of transistors 392 and 393 passing current and the aforementioned design being made so that negative pulses trigger the flip-flops, it will be apparent that if a downward count is to be established due to a control provided by a voltage on the conductor 345, the steering diode 430 must be activated to pass current. Then, if the transistor 393 is conducting, a pulse will be passed through to the second flip-flop by way of the coupling condenser 451 and one of the diodes 452 or 453 (depending upon the state of conductivity of the transistors 454 and 455 of the second flip-flop 55). This control pulse is applied, as explained in connection with the first flip-flop, to the base electrodes 457 or 458 as the case may be.

If, on the other hand, a voltage pulse appears on the conductor 346 at the time the oscillator 341 provides its triggering pulse along conductor 381 and through condenser 383, the steering diode 431 will be carried to a conductive state and, similarly to the control exercised through the steering diode 430, a pulse will be passed through the capacitor 461 to trigger the second flip-flop circuit 55. Triggering of either transistor 454 or 455 of the second flip-flop produces a change in the current flow through the load resistors 462 or 463, as the case may be. Consequently, the control effected on the flip-flop 55 will control the current flow through either transistor 464 or 465 of the switching unit 67, similar to the control above explained for unit 65. If the "steering" diode rendered conductive is not connected to the output of the transistor of the preceding flip-flop which produces the assumed negative pulse, no change in current flow in the next flip-flop results. If it is connected to the unit producing the negative pulse the associated flip-flop circuit will count.

The transistors 464 and 465 have the current flow therethrough determined by the control of the potential on the base electrodes thereof. The collector electrodes, like the collector electrodes of transistors 415 and 416, are connected so that, in the case of the transistors 416 and 465, the collectors are held at a positive potential relative to ground by way of the connection through conductor 467 to the source connected at terminal 185, but in the case of transistors 415, 464, and those similarly located in the switching units, the collectors are grounded.

The transistors 464 and 465 draw their current through the load resistor 471, the value of which, like that of resistor 421 for the first switching unit 65, is generally critical, as will later be explained. Further than this, when the transistors of the switching units 65 or 67 are controlled, the control effected on the lower transistors, such as 415 or 464, is provided by way of the conductor 480 in the case of transistor 415 and conductor 481 in the case of transistor 464 so that current flow through the controlling transistor, such as 392 or 454, provides a negative potential on conductors 480 or 481 and thus initiates a current flow through the diode 482 or 483 each connecting into conductor 484 which connects to the base 485 of controlling transistor 486.

If, on the other hand, illustratively, transistors 393 and/or 455 happen to conduct thereby to control and initiate current flow through transistors 416 and at times also 465 by way of the connections 490 and 491 connected across the load resistors 443 and 463, respectively, of transistors 393 and 455, a current flow occurs also through diodes 493 and 494 (the latter conducting if current flows in conductor 491) which is supplied by way of conductor 495 and thence through diode 496 to the base 497 of a control transistor 498.

Transistors 486 and 498 have their emitters 501 and 502, respectively, grounded at 147. Each transistor is supplied at its collector electrode 503 or 504, as the case may be, with a positive voltage from the terminal point 145 in such fashion that the voltage on the collector 503 of transistor 486 is supplied through load resistor 507 of transistor 296, as the high comparator, and the voltage on collector 504 of transistor 498 is provided through the load resistor 509 of transistor 310, as the low comparator. Under the circumstances, it is apparent that transistors 486 and 296 have a common load resistor, as do transistors 498 and 310. The purpose of this will later be explained.

Figure 5D:
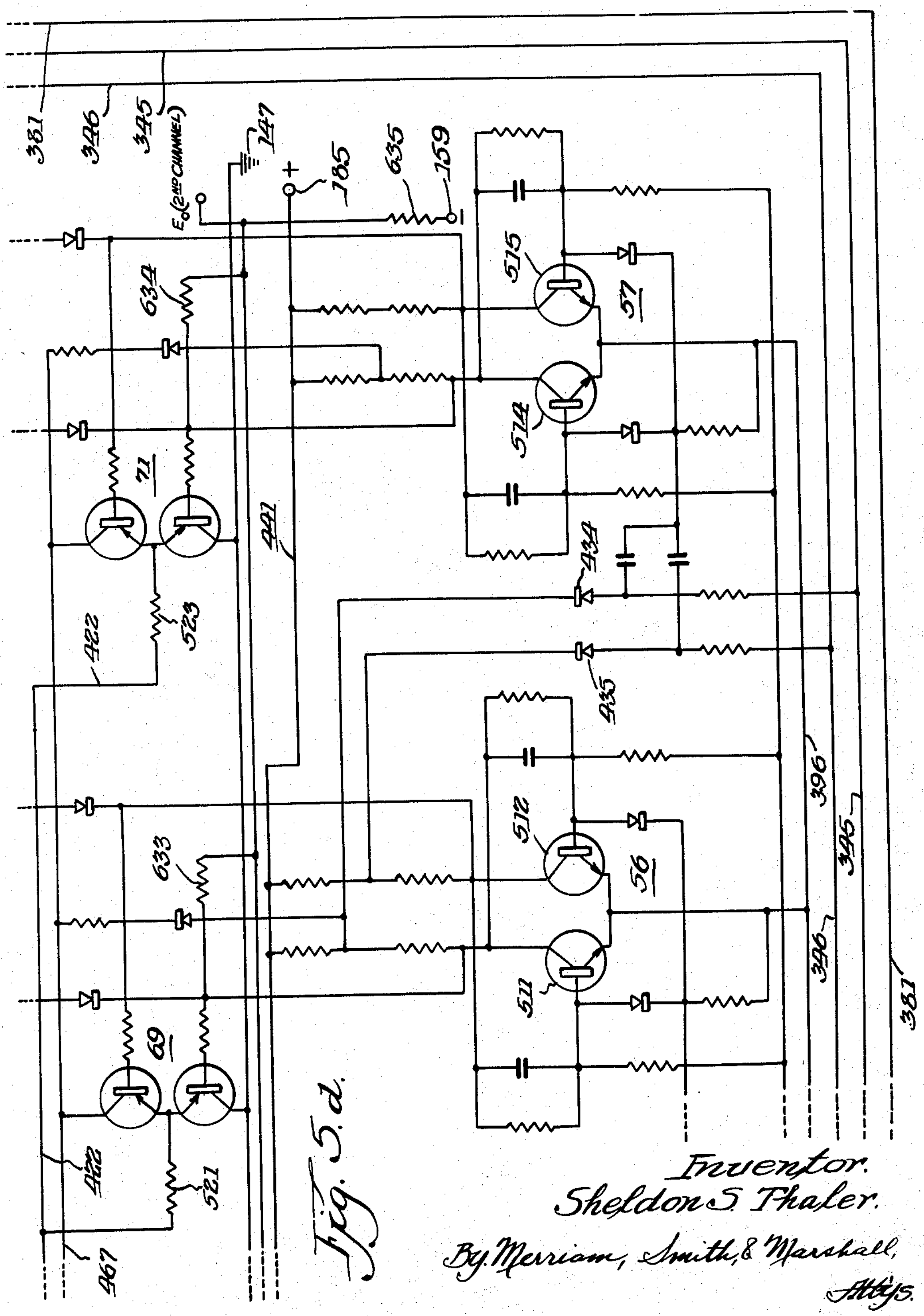

Following through now the flip-flop and switching circuit elements, reference may be made more specifically to FIG. 5*d* and, following the analogy heretofore made, in the flip-flop circuit 56 the connections are such that either transistor 511 or transistor 512 conducts. Then, depending upon which of the steering diodes 431 or 432 happens to be conducting, will determine whether or not a switching pulse is fed into the flip-flop stage 56 by reason of a control pulse applied to the first flip-flop 54 and through the second flip-flop 55.

Similarly, in the fourth flip-flop stage, shown at 57, one or the other of transistors 514 or 515 conducts and whether or not a switching operation occurs is determined by the steering diodes 434 and 435 controlling whether or not a pulse is fed through the coupling condensers in the fashion explained in connection with the flip-flop 55, for instance. Control of current through the switching units 69 and 71 is similar to that explained for switching units 65 and 67 and need not here be repeated except to note particularly that the switching unit 69 draws its current through the load resistor 521 and switching unit 71 draws its current through load resistor 573.

In the case of the binary circuit, the connections shown in FIGS. 5*c* and 5*d* for the flip-flops are such that for a four-stage binary the first flip-flop 54 controls the binary digit furthest to the right (the lowest number). The flip-flop stage 55 controls the next most right hand digit and, lastly, the flip-flop stage 57 controls the digit most to the left. Thus, for the binary number 0110, the 0 to the right will be represented by the condition of flip-flop stage 54. The numeral 1 to its left is representative with the condition of the flip-flop stage 55. The numeral 1 next to the left is representative of the flip-flop stage 56, while the left hand number 0 is representative of the condition of the flip-flop 57.

If now the previous count is 0110 (as last stated) and a condition occurs where the binary count is to be in the upward direction, the next input pulse on conductor 381 will produce the binary number 0111. This will change only the state of operation of the left hand flip-flop 54. This is because the circuit is so functioning that a pulse passed through one or the other of the steering diodes 430 or 431 is effective only in a circuit path of a non-conducting transistor in the first flip-flop so that the second stage will not be triggered. The same condition occurs for the third and fourth stages 56 and 57. With the changed condition the binary number becomes 0111.

However, starting with a count at 0111 for an upward count, the next pulse on conductor 381 will trigger the flip-flop 54. Then, following through with all binary counting operations, it will be seen that because the next upward binary number is 1000, all of the flip-flop circuits 54, 55, 56 and 57 will switch.

On the other hand, if one starts with the assumed count 0111, as above stated, and the count is to be in a downward direction, the next lower binary number will be 0110 and, consequently, following the same analogy and exercising similar controls on the steering diodes, the steering diodes 431 and 433 will be activated and both flip-flops 54 and 55 will trigger, but the flip-flops 56 or 57 will remain in their previous operational state.

Whenever the flip-flops are operating, current flow occurs through the co-ordinated switching circuits 64, 67, 69 and 71. In the circuit operation the value of resistors 421, 471, 521 and 523 of the switching circuits 65, 67, 69 and 71 are generally critical. Illustratively, for a four-stage binary these resistance values may be, respectively, 280,000 ohms, 140,000 ohms, 70,000 ohms, and 35,000 ohms, so that there is a relationship progressing from stage 65 through stage 71 where the next succeeding load resistor is one-half that of the previous stage.

From what has been stated above and with the assumed conditions of output represented by the wave forms of FIGS. 2*a* and 2*b*, the serial counters 54 through 57 conduct to count up to a maximum of 16 (with a four-stage binary) until the voltage represented by the value $E_{01}$ is less than the assumed five volts. If then this value is between the limits of the high and low comparators 44 and 45, the serial counter is at the proper binary output and the system is stable. Counting downwardly occurs when the output is below that of the low comparator 45 and continues until equilibrium is restored. Counting upwardly occurs when the signal is greater than that of the high comparator, as already stated.

When current flows through the switching networks 65, 67, 69 and 71 and through the conductors 422, 423 and 35, the comparison or feed-back signal passing through the Zener compensator 219 controls the current flow through the transistor 215 and compensation is effected. At the same time, it is apparent that, with transistors 486 and 498 being activated in accordance with the voltage effective on the conductors 484 or 495, a current flow through the transistor 498 which draws its current through the load resistor 508 of the low compensator 310 will finally disable the low compensator and likewise a current flow through the transistor 486 which draws its current through the load resistor 507 of the high comparator 296 will finally disable this component. With the components 44 or 45 disabled, the oscillator circuit 341 will finally cease to receive pulse control signals and its counting operation will cease. The inhibiting level of the inhibiting gate 59 is determined by the current flow through transistors 486 or 498, as the case may be. The output may be directly read and obtained.

From the above discussion, it will be apparent that a signal voltage is available at the first output channel (shown at $E_o$ at the terminal point 39) which is indicative of the analog input signal at the terminal 11. Such signal, however, as can be seen from the curve of FIG. 2*b*, is not necessarily indicative of which of the several signal levels obtainable is instantaneously applicable. Accordingly, for some forms of operation it is desirable to provide circuitry by which the particular level, rather than what might be termed the vernier level, is determinable. To this end, as can be seen particularly from the diagrammatic showing of FIG. 1, a second output is derived from the switching units 65, 67, 69 and 71 (or, if desired, from the flip-flops 54 through 57) which is represented by the voltages supplied by way of conductors 623, 624, 625 and 626 which connect, as shown, to the switching units and thence to the conductor 91 leading to terminal point 93 whereat an output signal corresponding to that shown by FIG. 2*a* is available. This signal establishes a coarse indication of the particular event happening. At times, where the indication of the coarse adjustment is available directly from the input signal the second channel, as shown, becomes unnecessary but is nonetheless helpful for many installations.

To exemplify one circuit form by which the invention may be practiced, reference may be made particularly to the showing of FIGS. 5*c* and 5*d*. In this arrangement it will be noted that resistors 631, 632, 633 and 634, respectively, connect at the lower end of the base electrodes of transistors 416, 464, 465 and 466 of the switching units 65, 67, 69 and 71. The connection, as will be apparent, is equivalent to connecting the resistors to the left-hand transistor (looking at FIGS. 5*c* and 5*d*) of the flip-flop circuits 54 through 57. The free end of resistors 631 through 634 are connected to a common resistor 635 which connects to terminal point 159 whereat a negative voltage is applied. The common connecting point of all of resistors 631 through 635 is then connected to the conductor 91 leading to the output terminal 93. This is a form of connection which in some instances proves desirable, particularly where the amplifier circuitry herein described is to be used with computer apparatus, but where the coarse setting is otherwise known, this is not necessarily required.

Generally speaking, the circuit parameters are noncritical in nature. The transistors of the switching units 65, 67, 69 and 71 may all be of the type known as the SA59. All transistors of the flip-flops 54 through 57 may be of the type known as the NS787. The transistors of the inhibitor oscillator 341, those comprising the high and low comparator, that of the emitter-follower 291, and transistor elements 213, 225 and 227 may be of the same type as used in the flip-flop circuits. Generally speaking, the transistors for the chopper circuit are preferably of the 2N2331 type. The diodes may be selected at will, but generally speaking, diodes of the type 1N484B have been found to be satisfactory for all such units shown. Resistance values and those of capacity may be appropriately chosen. The Zener diodes 305 and 379 are of the preferable type 1N709. Zener diodes of the power supply may be chosen in accordance with the voltages desired. For instance, Zener diodes 180 and 181 may be of the type 1N936, while Zener diode 126 may be a 1N939. Any voltages herein suggested are purely illustrative but are well adapted to the operation herein obtained.

Having now described the invention, what is claimed is:

1. Telemetry circuitry comprising a phase-responsive device, means to energize the device selectively and sequentially by each of a selected input signal and a selected control signal, a counting circuit, means responsive to the output of the phase-responsive device to control the response of the counting circuit by the input signals to count reversibly up or down when the signal input is greater or less than a pre-selected signal level, and means to interrupt the counting circuit operation upon achievement of a selected stable value.

2. Telemetry circuitry comprising an amplifying device, means to supply each of a selected input signal and a selected control signal selectively and sequentially to the amplifying device, a phase-sensitive network connected to receive alternately each supplied signal voltage, a counting circuit, means to control the response of the counting circuit by the supplied signals to count reversibly up or down when the signal as determined by the phase-sensitive network exceeds or is less than a pre-selected signal level, and means to interrupt the counting circuit operation upon achievement of a selected count.

3. Telemetry circuitry comprising an amplifying device, a chopper means to supply each of a selected input signal and a selected control signal selectively and sequentially to the amplifying device, a phase-sensitive network connected to receive alternately each supplied signal voltage, a counting circuit, a pulsing circuit, means to initiate operation of the pulsing circuit under control of supplied signals, means to control the response of the counting circuit by the pulsing circuit, means to control the direction of count by the counting circuit reversibly up and down by signals derived from the phase-sensitive network at a time when the signal exceeds or is less than a pre-selected signal level, and means to interrupt the counting circuit operation upon achievement of a selected count.

4. Telemetry circuitry compirsing chopper means to distribute each of a selected input analog signal and a selected control signal selectively and sequentially, a phase-sensitive network connected to receive alternately each supplied and distributed signal voltage, a counting circuit, a pulsing circuit, means to initiate operation of the pulsing circuit under control of supplied signals during time periods when the analog signal departs from a selected normal, means to control the response of the counting circuit by the pulsing circuit, means to control the direction of count by the counting circuit reversibly up and down by signals derived from the phase-sensitive network at a time when the signal exceeds or is less than the pre-selected normal signal level, switching means controlled by the counter output, and means controlled by the switching means to interrupt the counting circuit operation upon achievement of a selected count.

5. Telemetry circuitry comprising chopper means to distribute each of a selected input analog signal and a selected control signal selectively and sequentially, a phase-sensitive network connected to receive alternately each supplied and distributed signal voltage, a counting circuit, a pulsing circuit, means to initiate operation of the pulsing circuit under control of supplied signals during time periods when the analog signal departs from a selected normal, means to control the response of the counting circuit by the pulsing circuit, means to control the direction of count by the counting circuit reversibly up and down by signals derived from the phase-sensitive network at a time when the signal exceeds or is less than the pre-selected normal signal level, switching means controlled by the counter output, means to modify the control signal under the control of the output from the switching circuit and the phase-sensitive network, and means controlled by the switching means to interrupt the counting circuit operation upon achievement of a selected count.

6. Telemetry circuitry comprising an amplifying device, a chopper means to supply each of a selected input signal and a selected control signal selectively and sequentially to the amplifying device, a phase-sensitive network connected to receive alternately each supplied signal voltage, a counting circuit, a pulsing circuit, means to initiate operation of the pulsing circuit under control of supplied signals, means to control the response of the counting circuit by the pulsing circuit, means to control the direction of count by the counting circuit reversibly up and down by signals derived from the phase-sensitive network at a time when the signal exceeds or is less than a pre-selected signal level, switching means controlled by the counter output, and means controlled by the switching means to interrupt the counting circuit operation upon achievement of a selected count.

7. Telemetry circuitry comprising means responsive selectively and alternately to an analog input signal and a locally produced control signal, a phase-sensitive circuit to detect differences between the alternately supplied analog signals and the control signal, a counting circuit, means to energize the counting circuit under control of the phase-sensitive circuit, means to cause the counting circuit to count reversibly up or down in accordance with the departure from a pre-set level from the phase-sensitive circuit, and means to interrupt the counting circuit operation upon achievement of a count corresponding to the pre-set level.

8. Telemetry circuitry comprising a signal amplifier device, a switching circuit to supply selectively an analog input signal and a control signal to the amplifier, a phase-sensitive circuit connected to receive the amplifier output and to detect differences between the sequentially supplied signals, a counting circuit, means to energize the counting circuit under control of the phase-sensitive network, means to cause the counting circuit to count reversibly up or down in accordance with the departures from a pre-set signal level from the phase-sensitive network, and means to interrupt the counting circuit operation upon achievement of the selected equilibrium level of signal.

9. The circuitry of claim 8 comprising, in addition, means to vary the level of the control signal under the control of each of the phase-sensitive and counter circuits.

10. Amplifying and counting circuitry comprising a signal chopper, means to apply each of a selected input signal and a selected control signal to the chopper, a phase-sensitive network connected to receive alternately the chopper output of each supplied signal voltage, an oscillator, counting circuit means adapted to be triggered by the oscillator, a circuit means adapted to respond to output signals from the phase-sensitive detector which exceed a selected signal level or which are less than the selected signal level to determine the direction of count of the counting circuit in an upward or downward direction depending upon the signal output from the comparator circuit, and means to interrupt oscillator operation and arrest the counting upon achievement of circuit stability and a corresponding selected count.

11. Telemetry circuitry comprising an amplifier device, signal switching means to energize the amplifier input selectively by an analog input signal and a control signal, a phase-sensitive circuit connected to receive amplified signals from the amplifier and to detect differences between the two sequentially supplied amplifier input signals, a counting circuit, a pulsing circuit controlled by the phase-sensitive circuit, means to energize the counting circuit under control of the pulsing circuit, signal comparator means to cause the counting circuit to count reversibly up or down in accordance with the departures of the signals derived from the phase-sensitive network from a pre-set level, means to interrupt the counting circuit operation upon achievement of the selected count corresponding to the obtainment level, switching means connected to the counting circuit, and means responsive to the combined output of the switching means and phase-sensitive circuit to modify from time to time the control signal.

12. Telemetering circuitry comprising means to receive analog signals, means locally to develop a stabilizing signal, a signal chopper, means to supply each of the analog signals and the stabilizing signal to the chopper to provide an output therefrom alternating between the two signals, a phase-sensitive network connected to receive the chopper output of the two signals, counting circuit means, an oscillator, circuit means adapted to respond to output signals from the phase-sensitive network to develop control signals when the chopper output exceeds a selected signal level or when less than the selected signal level, means to pulse the counter from the oscillator, means to limit the oscillator operation to periods when the signals exceed or are less than the selected level, means to determine the direction of count of the counting circuitry in an upward or downward direction depending upon the signal output, means for feeding back a portion of the output of the phase-sensitive network and a switching voltage determined by the signal count to the chopper circuit to stabilize the operation and interrupt oscillator operation upon achievement of a selected count.

13. Telemetry circuitry comprising a phase-responsive device, means for energizing the said device selectively and alternatively by each of an input signal and a control signal, means to derive from the input signal a coarse signal and a vernier signal, a counting circuit, means responsive to the output of the phase-responsive device to control the counting circuit response to derive signal information indicative of the vernier signal, and means to interrupt the counting circuit operation upon the achievement of a selected stable value of the vernier signal.

14. Telemetry circuitry comprising a pair of comparator circuits to determine signal levels above and below a range of selected signal values, means to supply input signals to the comparator circuits, counting circuit means, circuit means responsive to the outputs of the comparator circuits to initiate operation of the counting circuit, means to control the direction of count of the counting circuit for counting in an upward or a downward direction depending upon the signal output from the comparator circuits, and means to interrupt counting circuit operation upon achievement of a selected count.

15. Telemetry circuitry comprising comparator circuit means for determining a selected range of stability between transition points of digital selection and for initiating signals indicative of departures of an analog signal range outside the selected range of stability in each of an increasing and a decreasing order with equivalent ranges in each order being substantially equal so that the effect of hysteresis is present following each analog departure from the selected stable signal range, means to supply signal input to the comparator circuit means, counting circuit means for counting in an upward or downward direction in response to control signals from the comparator circuit means and with an up or a down count direction being determined by an increase or decrease in the supply signal range, and means to interrupt counting circuit operation upon the achievement of a selected count.

References Cited by the Examiner

UNITED STATES PATENTS 2,521,774 9/50 Bliss ______________ 328—48 XR
2,816,226 12/57 Forrest ______________ 328—44

ARTHUR GAUSS, *Primary Examiner.*